Nov. 14, 1967  T. McMILLIAN ETAL  3,352,144
HYDROPHONE DYNAMIC CALIBRATION SYSTEM
Filed May 21, 1965
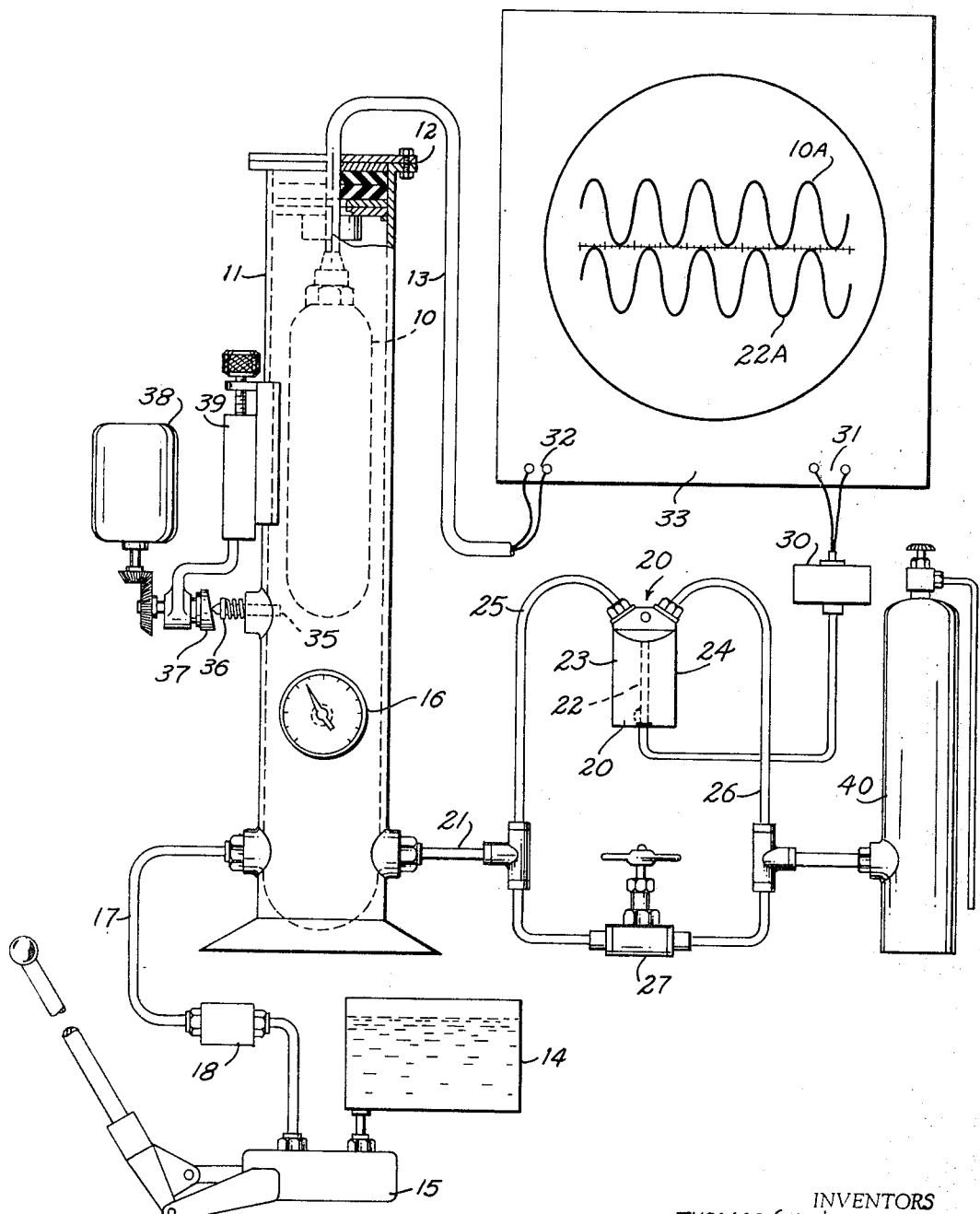
INVENTORS
THOMAS (NMI) McMILLIAN
LAWRENCE C. THOMPSON
BY
ATTORNEYS

3,352,144
HYDROPHONE DYNAMIC CALIBRATION SYSTEM
Thomas McMillian and Lawrence C. Thompson, San Diego, Calif., assignors to the United States of America as represented by the Secretary of the Navy
Filed May 21, 1965, Ser. No. 457,873
5 Claims. (Cl. 73—1)

The invention described herein may be manufactured and used by or for the Government of the United States of America for governmental purposes without the payment of any royalties thereon or therefor.

This invention relates to hydrophone calibration equipment and is particularly directed to calibration equipment for simulating high static pressure while neutralizing the effects of the high pressure on the moving surfaces of the hydrophone.

To convert sonic waves into electrical waves, the sonic waves must impinge upon and move a diaphragm or like moveable surface. The back side of the diaphragm must retreat in a field devoid of sonic waves, otherwise there will be neutralization and distortion of the signal. In submerged hydrophones the front and back surfaces of the diaphragm must be flooded, whereupon the problem presents itself of isolating the pressure wave from the rear of the diaphragm. It has been customary to seal the rear of the diaphragm or bolting surface so that it is not flooded, and hence the pressure wave of the sonic signal has no effect upon the rear of the diaphragm. Such hydrophones are of use only where moderate depths are involved. Where, however, depth of thousands of feet and thousands of pounds per square inch pressure are involved, it is not possible to prevent complete flooding of the front and rear surfaces of the pressure responsive diaphragm.

The object of this invention is to provide improved means for simulating static pressures of all magnitudes and calibrating hydrophones accurately at all those pressures.

It is customary to compare the performance of two hydrophones one of which is accepted as being the "standard." That is, the hydrophone, under test, and the standard hydrophone are exposed to the same stimuli and the signal outputs of the two are compared.

A further object of this invention is to provide improved means for comparing the performance of two hydrophones, with means for obviating the effects of high static pressure.

The objects of this invention are attained by submerging the two hydrophones in a chamber the internal pressure of which can be increased to any desired static level. Ducts are provided for flooding the front and rear surfaces of the standard hydrophone diaphragm with valves for isolating the rear of the diaphragm from the water system during actual ensonification of the water medium within the container. By this system pressure waves of a few dynes per square centimeter can easily be recorded in a background of static pressures of thousands of pound per square inch.

Other objects and features of this invention will become apparent to those skilled in the art by referring to the embodiment described in the following specification and shown in the accompanying drawing in which the single figure is a block diagram of the test equipment of the invention.

The internal dimensions of chamber 11 are ample to receive the hydrophone 10 to be tested. The walls of the chamber 11 and fittings are massive to withstand internal pressures corresponding to submergence of many thousands of feet. The hydrophone 10 is suspended in the chamber by its lead-in cord 13. The cord 13, in the embodiment shown, is sealed for high water pressures by the sandwich gland 12. The gland 12 exerts considerable pressure on the cord 13 and is demountable to permit easy access to the interior of the chamber.

It is intended that the chamber 11 be filled with water from source 14. The water is pumped into the chamber with pump 15 which is operated by a drive mechanism having a high mechanical advantage and a small piston so that the desired high pressures can be attained. Pressure within the chamber is indicated on dial 16. The water supply line 17 should contain the check valve 18 to hold the pressure in the chamber once attained.

The interior of the standard hydrophone 20 communicates through ducts 21 to the interior of the chamber 11. While many commercial embodiments of the hydrophone 20 are obtainable, the particular hydrophone contemplated here comprises a chamber divided into two parts by the diaphragm 22. The diaphragm 22 in the embodiment shown comprises relatively moveable foil-like metallic sheets joined along their periphery to the walls of the chamber 21 to divide the chamber into two compartments. Electrical terminals, not shown, are connected to the two sheets so as to record changes in capacity caused by minute changes in pressure difference in the two chambers 23 and 24. Chamber 23 communicates with the chamber 11 through pipes 25 and 21. Chamber 24, however, communicates with pipe 21 through pipe 26 which, according to this invention, contains hand valve 27.

The capacitive values of diaphragm 22 are measured by the detector 30 containing, if desired, an oscillator responsive to the capacity at 22 and capable of yielding a voltage at terminals 31 proportional to the instantaneous differential pressure in chambers 23 and 24. Terminals 32 of the oscilloscope 33 are connected to the lead conductors 13 of the hydrophone under test. In operation the electrical waveforms at terminals 31 and 32 can be time-shared on the vertical deflection electrodes of the oscilloscope so that the two waves can be super-imposed or displayed side-by-side for comparison of form.

The particular device shown for introducing sonic waves to the chamber 11 comprises the piston 36. The inclined surface of the wobble plate 37 rotates against the outer end of the piston 36 to reciprocate the piston. The inner end 35 of the piston moves in the liquid under pressure. The amplitude of reciprocation is controlled by the amount of displacement of the wobble plate from the center of the piston. The frequency of the sonic wave is controlled by the speed of the variable speed motor 38. The particular amplitude adjusting means includes the lead screw with knurled head 39 which carries the wobble plate.

The procedure for testing the hydrophone 10 comprises completing the seal 12 for the lead-in 13 and then filling the chamber with water. Oil could be used if desired. The valve 27 is open to permit the water to flood completely chambers 23 and 24 of the hydrophone 20, and while the valve 27 is still open the pressure of the hydraulic system is raised to the desired level by pump 15. Then and then only is valve 27 closed to completely isolate the chamber 24 at the backside of the hydrophone diaphragm from pressure waves within the chamber 11. It will be noted, however, that the chamber 24 is at the same static pressure or the opposite chamber 23 and that there is no differential pressure between these two chambers. Now, the same sonic wave which impinges upon hydrophone 10 is transmitted to the front surface of diaphragm 22. The voltage signals at terminals 31 and 32 should be identical if hydrophone 10 faithfully reproduces the pressure wave it receives. To further insure that the backside of diaphragm 22 receives no signal component from the pressure wave, the surge tank 40 may be connected to the ducts of chamber 24. By displaying the oscillograms 10a and 22a corresponding to the electrical signals of hydrophones 10 and 22, respectively, the wave forms of the two hydrophones can readily be compared. If there is any difference in the wave shape of the two oscillograms the differences are readily apparent.

Since the entire system may be under high pressure it is important in depressurizing the system to first open valve 27. Otherwise, the high pressure in chamber 24 could rupture the diaphragm 22.

Many modifications may be made in the system of this invention without departing from the scope of the invention as defined in the appended claims.

What is claimed is:

1. A hydrophone calibrating system comprising;
   a chamber filled with liquid to receive the hydrophone to be tested;
   a pressure pump for elevating the pressure of said liquid to any desired level;
   a standard pressure wave-to-signal transducer consisting of a pressure-sensitive diaphragm, and ducts communicating between the spaces respectively, on either side of said diaphragm and the interior of said chamber for flooding both sides of said diaphragm to said pressure level;
   a valve in the duct to one side of said diaphragm for selectively isolating said one side;
   a reciprocating member in said chamber for creating pressure waves of predetermined amplitude and frequency; and
   means for comparing the wave shape of the signals at the terminals of said hydrophone under test with the wave shape of the signal at the terminals of said standard transducer.

2. The system defined in claim 1 comprising a reciprocating piston in the wall of said chamber; and
   means for controlling the amplitude and frequency of reciprocation.

3. The system defined in claim 1 further comprising a buffer surge tank communicating with said chamber at the rear of said diaphragm.

4. The system defined in claim 1 comprising a hydraulic pump for filling said chamber under pressure and a check valve in the supply pipe of said pump.

5. In the system defined in claim 1 said reciprocating member comprising a piston extending through the wall of said chamber;
   a wobble plate bearing against the outer end of said piston and a variable speed motor for driving said wobble plate, and means for adjusting the eccentricity of said wobble plate with respect to said piston.

References Cited
UNITED STATES PATENTS

| | | |
|---|---|---|
| 2,715,331 | 8/1955 | Yates et al. |
| 2,802,984 | 8/1957 | Sussman. |
| 2,976,715 | 3/1961 | Roese et al. |
| 3,121,211 | 2/1964 | Eskin et al. |

LOUIS R. PRINCE, *Primary Examiner.*

C. S. SWISHER, *Assistant Examiner.*